United States Patent [19]

Dolan et al.

[11] Patent Number: 5,266,749
[45] Date of Patent: Nov. 30, 1993

[54] LOCKING MECHANISM FOR A VIBRATING TRAY SCALE

[75] Inventors: Donald T. Dolan, Ridgefield; David D. Kelly, Shelton; Vladimir V. Pirc, Norwalk, all of Conn.

[73] Assignee: Pitney Bowes Inc., Stamford, Conn.

[21] Appl. No.: 889,568

[22] Filed: May 28, 1992

[51] Int. Cl.$^5$ .............................................. G01G 23/02
[52] U.S. Cl. ................................................... 177/154
[58] Field of Search ......................................... 177/154

[56] References Cited

U.S. PATENT DOCUMENTS 4,778,018 10/1988 Cordery et al. ................. 177/154 X Primary Examiner—George H. Miller, Jr.
Attorney, Agent, or Firm—Peter Vrahotes; Melvin J. Scolnick

[57] ABSTRACT

This invention relates to locking mechanism for a weighing scale capable of weighing flat articles at a high rate and with a high degree of accuracy. The locking mechanism of the instant invention is applicable to a vibrating tray type scale which requires a mechanism for stabilizing the base of the scale during periods when articles are being conveyed onto and off the tray of the scale. An electromagnetic locking mechanism has been conceived that provides advantageous for a vibrating tray scale. These advantages are simple construction, low cost, self compensating and zero force requirement. With a such locking mechanism, the vibrating tray scale functions more accurately and rapidly.

6 Claims, 2 Drawing Sheets

LOCKING MECHANISM FOR A VIBRATING TRAY SCALE

BACKGROUND OF THE INVENTION

Weighting scales capable of rapidly weighing a series of flat articles have recently been developed. One type of such scale is a vibrating tray scale wherein a flat article is conveyed onto the platform of the scale, the conveying mechanism is removed from contact with the article, a holding device holds the flat article firmly on the platform, and the platform is oscillated thereby causing flex-members that support the platform to oscillate. A transducer is attached to one of the flex-members to measure the frequency of oscillation of the platform. Based upon such measurement, the weight of the article on the platform can be determined. Details relative to the structure of a vibrating tray scale, the method of operation and the method of determining the mass of an article thereon are fully described in U.S. Pat. No. 4,778,018. With such a scale, one is able to weigh articles at rate of two to four articles per second. The rate of weighing depends upon the size of the articles to be weighed as well as the characteristics of the particular vibrating tray scale.

One of the important features of a vibrating tray scale is the need to lock the base of the scale when the tray is not being vibrated for purposes of obtaining the weight of an article on the tray. The base of the scale is that part which provides support to the flex-members and the base in turn is supported by a frame or housing. Various locking mechanisms have been used with success for the purpose of achieving stabilization of the base during the time articles are transported on and off the tray. In U.S. Pat. No. 4,778,018 a solenoid type of device is used that clamps onto the base from the top and bottom. In U.S. Pat. No. 4,836,311 a mechanism is described that not only provides a locking mechanism but also initiates the oscillation of the tray. In U.S. Pat. No. 4,844,188 a mechanical locking device is shown that is activated to lock the base upon the article transporting mechanism being activated and deactivated when the article is to be weighed. Although all of these locking mechanisms have worked satisfactorily well, a need still exists for a relatively simple, reliable and fast locking mechanism.

SUMMARY OF THE INVENTION

A locking mechanism for a vibrating tray scale has been conceived that is not only simple, reliable and fast, but also contributes to greater weighing accuracy. This locking mechanism is used to lock the base of the weighing scale during the time flat articles are transported onto and off the tray before and after being weighed. The locking mechanism includes an armature plate that is attached to the base of the scale and an electromagnetic device that is secured by a flexure spring to the frame of the scale.

Upon energization of the electromagnetic device, the biasing force of the spring is overcome and the electromagnet is attracted to and engages the armature to hold the base of the scale stationary. While the base is stationary, articles are transported onto and off the platform. During the weighing of the the articles, the electromagnet is de-energized and a spring removes the electromagnetic from contact with the armature. During the period the electromagnetic device is disabled, an article can be weighed. After weighing, the base will be locked again by energizing the electromagnet, the article will be removed from the tray, and another article will be placed thereon.

The greater accuracy that accompanies use of the instant locking mechanism results from the self compensating effect of the mechanism; whereby, the base is located in the position at which it comes to rest without being moved into a set position as was done with prior locking mechanisms.

DETAILED DESCRIPTION OF THE PREFERRED EMBODIMENT

Figure 1:
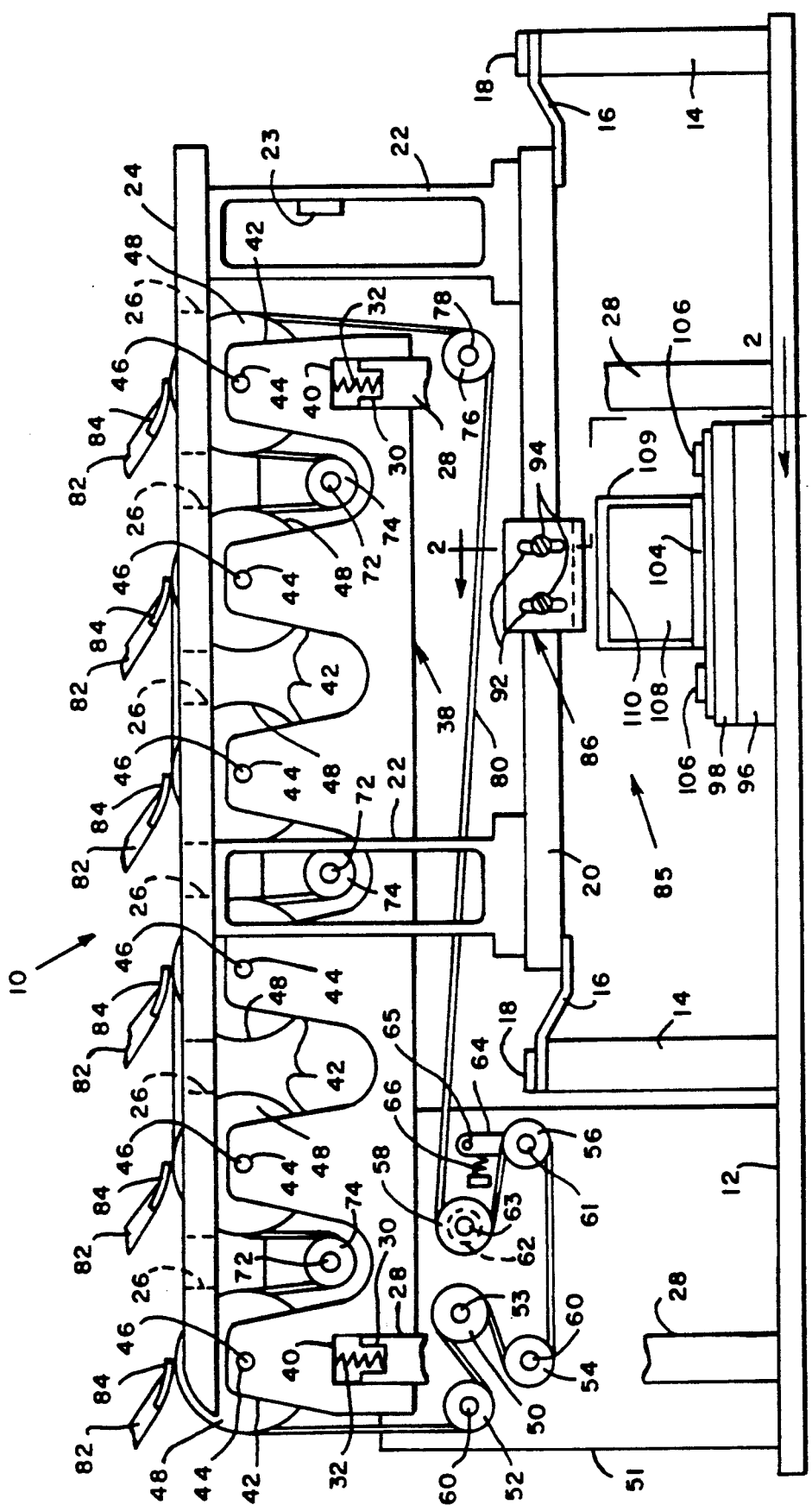
FIG. 1 shows a cross sectional view of a vibrating tray scale that incorporates the instant invention.

With initial reference to FIG. 1, a vibrating tray scale is shown generally at 10 and includes a frame 12 to which two upright plates 14 are secured. A pair of angular leaf springs 16 (only two being shown) are secured to each upright plate 14, as for example with bolts 18, and the springs 16 support a base 20. Four flex-members 22 (only two being shown) are supported by the base 20 and in turn support a tray 24. One of the flex-members 22 has a transducer 23 attached thereto for measuring oscillation of the flex-members. The details of the flex-members 22 are shown and described in U.S. Pat. No. 4,836,313 and will not be described in detail.

The tray 24 has a plurality of openings 26 therein. Two posts 28 are supported by the frame 12 and each has an opening 30. Each opening 30 receives a spring 32 therein. A carriage 38 has openings 40, each of which receives a post 28 and a spring 32, the springs having the effect of urging the carriage upwardly. The carriage 38 includes a plurality of laterally aligned pairs of projections 42, only one of each lateral pair being shown in FIG. 1. Each projection has an opening 44. The openings 44 of paired projections 42 receive a shaft 46 that rotatably supports a roller 48. Reference can be had to U.S. Pat. No. 4,844,188 for a more detailed description to the carriage 38 and associated components.

A number of small rollers is supported by a wall 51 including a drive roller 50 and a plurality of idler rollers 52, 54, 56, and 58. The drive roller 50 is secured to the shaft 53 of a motor (not shown). The rollers 52 and 54 are idler rollers that are rotatably supported by pins 60 secured to the wall 51. The roller 58 is supported by a one way clutch 62 that in turn is mounted on a pin 63 secured the wall 51. The roller 56 is rotatably supported by a pin 61 that is attached to a pivot arm 64. The pivot arm 64 is pivotally mounted on a pin 65 that is secured to the wall 51 and an expansion spring 66 has one of its ends attached to the pivot arm and its other end attached to an abutment 68 secured to the wall 51. This allows the roller 56 to be pivotally moved and urged in a counter-clockwise direction by the spring 66. Pins 72 are secured to the frame (by means not shown) intermediate the projections 42 and rotatably support rollers 74 and another roller 76 is rotatably mounted on a pin 78, the later being supported by the frame (by means not shown). A belt 80 is trained about the rollers 48, 50, 52, 54, 56, 58, 74 and 76. By actuation of the one way clutch 62, thereby braking the roller 68, as the belt is being driven by the drive roller 50, the roller 56 will be driven in a clockwise direction as seen in FIG. 1 and urged to the right so as to "contract" the belt 80 to cause the carriage 38 to be pulled downwardly to overcome the springs 32 of the brackets 28. Upon release of the one way clutch 62, the rollers 58 will rotate freely and the springs 52 will urge the carriage 38 upwardly. Reference can be had to U.S. Pat. No. 4,844,188 for a full description as to the functioning of such a pull down and release mechanism. It will be appreciated that other pull down and release mechanisms can be used as well and the type of such mechanism does not form part of the instant invention.

Located above the tray 24 and in registration with each roller 48 are a plurality of arms 82 each of which has a paddle 84 at the end thereof. The arms 84 are supported by the tray 24 by means not shown. Each paddle 84 engages the belt 80 portions trained about some of the rollers 48 when the carriage 38 is in its uppermost position. In such a position, when the drive roller 50 is rotated, and the one way clutch 62 is disengaged, mail placed between the nip of the first paddle 84 and the belt 80 will be conveyed onto the platform 24 until such time as the flat is observed (by means not shown). After the flat is observed, the one way clutch will be activated and the carriage 28 will be lowered. Again, reference can be had to U.S. Pat. No. 4,844,188 for details of this operation. With the carriage 38 lowered, the article on the platform will be weighed as described in U.S. Pat. No. 4,778,018.

What has been shown and described to this point does not form part of the instant invention and has been included only for the purpose of describing the environment in which the instant invention can be practiced.

Figure 2:
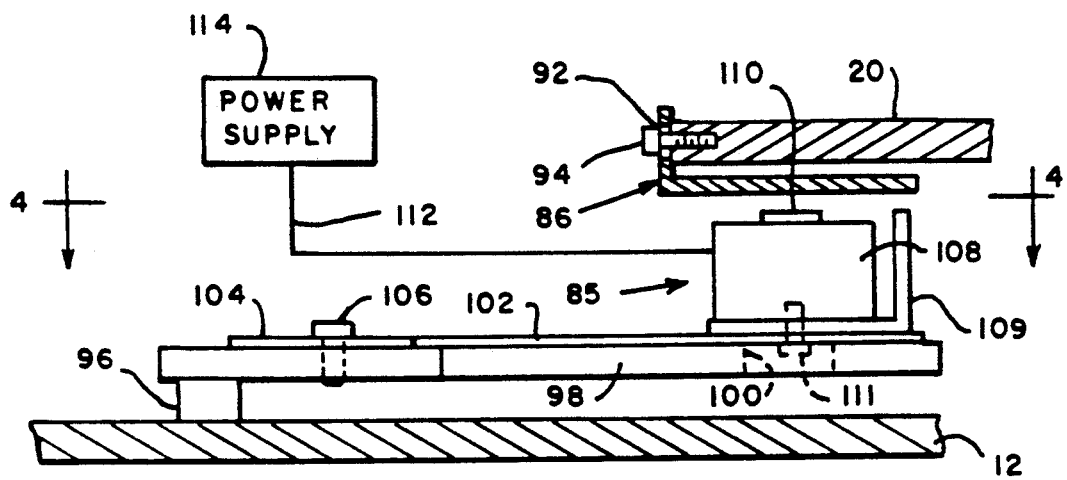
FIG. 2 is a cross sectional view of the locking mechanism for the vibrating tray scale in the unlocked portion taken along the lines 2—2 of FIG. 1.
Figure 3:
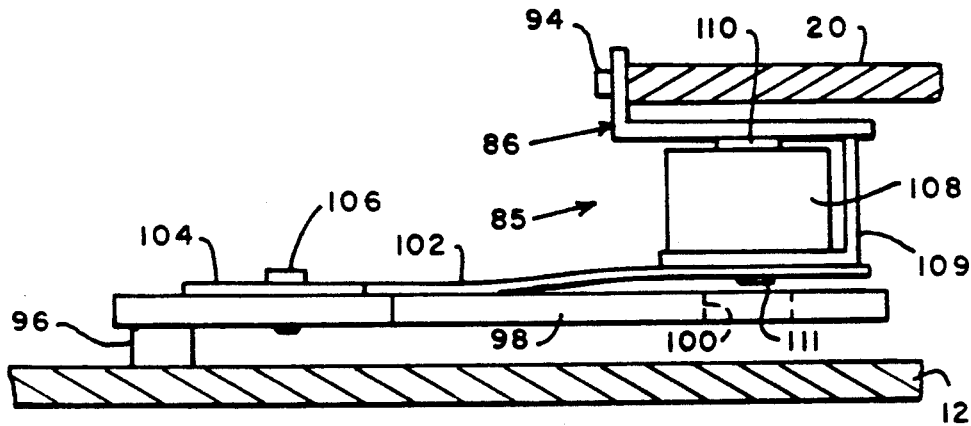
FIG. 3 is a cross sectional view of the locking mechanism in the locked position taken along the lines 2—2 of FIG. 1.
Figure 4:
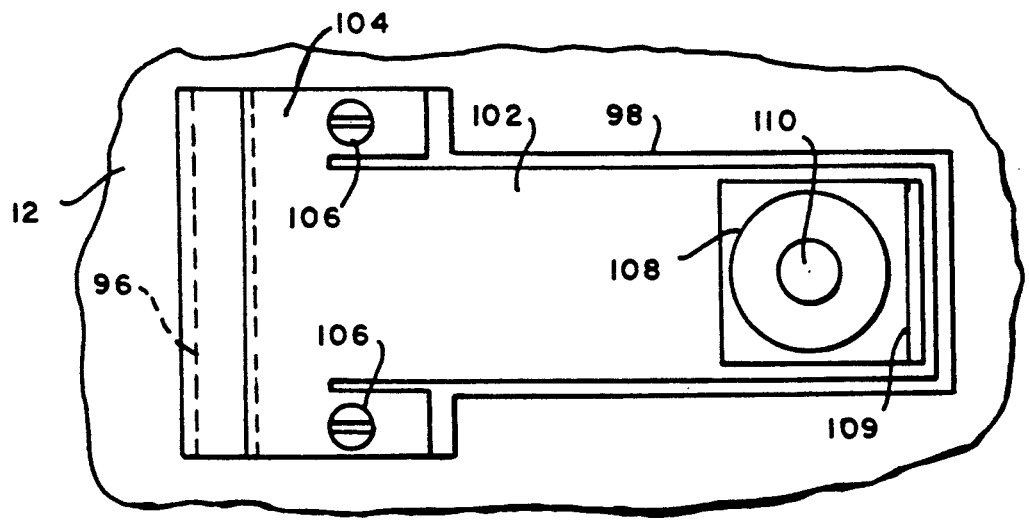
FIG. 4 is a plan view of a portion of the locking mechanism shown in FIG. 2 and 3 and taken along the lines 4—4 of FIG. 2.

Referring now particularly to FIGS. 2 and 3, a locking mechanism is shown at 85 and includes a generally L shaped armature 86 having elongated, vertically extending openings 92 which is attached to the base 20 as by bolts 94 received within the elongated openings. An elongated, laterally extending block 96 is secured to the frame 12 and supports a rigid platform 98 which has an opening 100 therein. Attached to the platform 98 is one end of a leaf spring 102, which leaf spring has a base portion 104 that is attached to the platform 98 as by bolts 106. An electromagnet 108 has a button 110 at the top thereof and is secured to the leaf spring 102 by a bolt 111 that is receivable within the opening 100. Secured intermediate the electromagnet 108 and, leaf spring 102 is an L-shaped guard 109 the vertical extent of which is horizontally aligned with the top of the button 110. A power line 112 is connected to the electromagnetic 108 and is attached to any convenient power supply 114 (shown only in FIG. 3). With such configuration, the leaf spring 102 urges the electromagnet 108 downwardly away from the armature 86 when no power is supplied to the electromagnet 108 by the power supply 114.

In operation, the vibrating tray scale 10 requires stabilization of the base 20 during non weighing time in order to keep the base from swaying due to vibrations created when an article is being conveyed onto the tray 24. After an article has been transported onto the scale tray 24, the transport carriage 38 is lowered into the article non contacting, weighing position, the locking mechanism 85 is de-energized, thereby allowing the spring 102 to pull to button 110 away from the armature 86 and releasing the base 20 to free the system for weighing. At the end of the weighing cycle, the locking mechanism 85 is re-energized by supply power from the power source 114 to restabilize the base.

When the electro magnet 108 of the locking mechanism 85 is energized, it is attracted to the armature 86 which is attached to the base 20 by the two adjusting screws 94. This causes the electro magnetic 108 to lift upwardly because of the magnet attraction to the armature 86 and become attached to the armature, thereby bending the leaf spring 102 as seen in FIG. 3. Since the spring 102 and the block 96 are connected as one piece, they form a mechanical connection between the base 20 and the electromagnet 85 thus effectively connecting the base to the frame 12. The effect is to physically lock the scale base 20 to the frame 12 and create potential energy in the leaf spring 102. When the electromagnet 108 is deenergized, the leaf spring 102 will assume its original shape, as seen in FIG. 2, to drive the the electromagnet to its lower position allowing a gap between the button 110 and the armature 86 thus freeing the scale base for weighing. For optimum performance, the preferred gap between the button 96 and the armature 86 is adjusted to 0.030 inches when the locking mechanism 85 is deenergized.

The advantages of the locking mechanism 85 shown and described are that of simplicity and low cost, self compensation, zero force, and high efficiency. The locking mechanism 85 of the instant invention contains few components and thus is simple in structure and inexpensive in construction. The self compensating factor is a result of the position of the scale base 20 relative to the frame 12 dependent on the leveling of the frame on the frame's support. Since the scale generally has no means to level itself, a requirement of the locking mechanism is to lock the base 20 in whatever position it may come to rest. A mechanism that uses detents, whether single or multiple, tends to produce a predetermined locking position for the scale base 12. This in turn effects the accuracy of the scale since this predetermined locking position may not be the natural locking position. The locking mechanism 85 of the instant invention has infinite positioning accuracy within its range and eliminates the positioning effect which reduces scale accuracy.

Prior mechanisms lock the base by pressing on the base scale. Upon release, these mechanisms impart a movement to the scale base 20. The locking mechanism 85 of the instant invention does not have this undesirable effect and thus there is a zero force imparted to the base 20 during release. Furthermore, prior locking mechanisms require approximately 200 milliamps at 60 volts, whereas the locking mechanism of the instant invention requires 40 milliamps at 40 volts for an improvement factor of 3.3.

The above embodiment has been given by way of illustration only and other embodiments of the instant invention will be apparent to those skilled in the art from consideration of the detailed description and the attached drawing. Accordingly, limitations on the instant invention are to be found only in the claims.

What is claimed is:

1. In a base locking mechanism for a vibrating tray scale that has a base, flex-members supported by said base, a frame, support members connecting said base to said frame, a tray for receiving articles to be weighed, said tray being supported by said flex-members, and means for holding an article onto the platform, the improvement comprising:

an armature secured to the base, an electromagnet supported by the frame and being movable into and out of engagement with said armature, a leaf spring connected at one of its ends to the electromagnet and to the base at its other end for urging said electromagnet away from said armature, and means for supplying power to said electromagnet to cause said electromagnet to be magnetically attracted to and engageable with said armature.

2. The locking mechanism of claim 1 further including means for adjusting the gap between said armature and said electromagnet when the electromagnet is not energized.

3. The locking mechanisms of claim 1 further including a stop secured to said said electromagnet, the stop being aligned with the engaging portion of said electromagnet when the electromagnet is energized.

4. In a base locking mechanism for a vibrating tray scale that has a frame, a base, support means connecting said base to said frame, flex-members supported by said base and a tray for receiving articles to be weighted, said tray being supported by said flex-members and means for holding an article onto the platform, the improvement comprising:

an armature secured to the base, an electromagnet movalby supported by said frame and movable into and out of engagement with said armature, a leaf spring connected to said electromagnet at one end and the base at its other end for urging said electromagnet away from said armature, and means for providing power to said electromagnet to cause said electromagnet to be attracted to and engaged with said armature, whereby upon power not being supplied to said electromagnet, said urging means will urge said electromagnet away from said armature.

5. The locking mechanism of claim 4 further including means for adjusting the gap between said armature and said electromagnet when the electromagnet is not energized.

6. The locking mechanism of claim 4 further including a stop secured to said means for supporting said platform, the top of said stop being in horizontal alignment with the contacting portion of said electromagnet.

* * * * *